F. W. MIX.

Indicator Lock.

No. 9,462. Reissued Nov. 9, 1880.

WITNESSES:

W. W. Hollingsworth

Edw. W. Byrn.

INVENTOR:

F. W. Mix

BY Munn & Co.

ATTORNEYS.

N. PETERS, PHOTO-LITHOGRAPHER, WASHINGTON, D. C.

UNITED STATES PATENT OFFICE.

FRANK W. MIX, OF TERRYVILLE, CONNECTICUT.

INDICATOR-LOCK.

SPECIFICATION forming part of Reissued Letters Patent No. 9,462, dated November 9, 1880.

Original No. 219,495, dated September 9, 1879. Application for reissue filed September 15, 1880.

*To all whom it may concern:*

Be it known that I, FRANK W. MIX, of Terryville, in the county of Litchfield and State of Connecticut, have invented certain new and useful Improvements in Indicator-Locks, of which the following is a specification.

My invention relates to certain improvements in that class of locks known as "indicator-locks," or locks which indicate through a dial mechanism any opening of the same by a key in the hands of unauthorized persons. This class of locks has special value in the mail service and in the shipment of goods in bond across the continent, where the custom duties are levied at the end of the route, and where it is possible to defraud the government by removing goods in transit, which are subject to high rates of duties, and substituting others of inferior quality, which are subject to smaller duties.

The object of my invention is to provide a lock which shall involve the certain detection of any surreptitious use of a key to unlock the lock; and to this end it consists in the peculiar construction and arrangement of parts hereinafter fully described, and pointed out in the claims.

Figure 1:
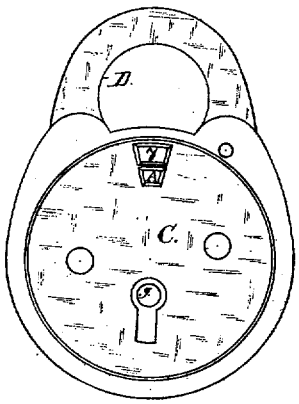
Figure 2:
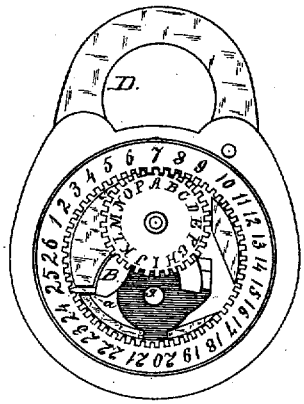
Figure 5:
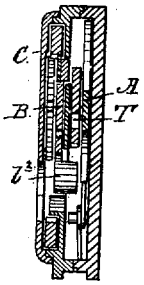
Figure 3:
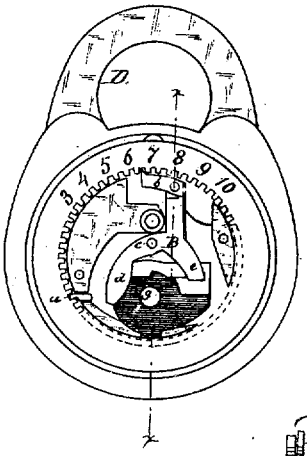
Figure 4:
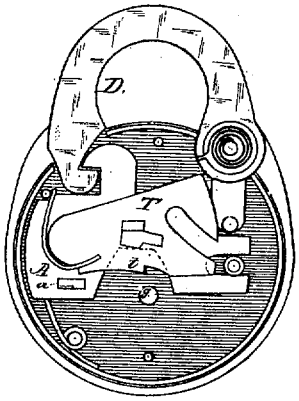
Figure 5:
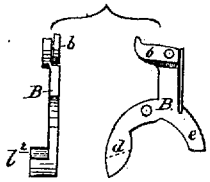

In the accompanying drawings, Figure 1 is a front elevation of an indicator-lock which embodies my invention. Fig. 2 is a like view of the same with the cap-plate removed. Fig. 3 is a like view with one of the rotating indicators removed in order to better show the operating-lever; and Fig. 4 is a like view with the indicator mechanism removed, thereby showing the interior of the lock. Fig. 5 is a cross-section of the lock through line *x x* of Fig. 3. Fig. 6 shows details of the pawl-lever.

The working parts of the lock herein shown are most clearly represented in Fig. 4, in which A designates a sliding bolt, the same bearing a stud, *a*, which projects forward and up through the front plate of the lock-case proper, for a purpose hereinafter described. This sliding bolt is thrown or forced out of engagement with the nose of the shackle D by means of a proper key and into engagement by means of a spring, (not shown,) so as to form a self-locking or spring lock. The particular locking mechanism is, however, no essential part of my invention, and any other locking mechanism may be substituted therefor in connection with the indicator mechanism, which I will now describe.

The middle portion of the front plate of the lock-case is cut away to make room for other parts. The bulk of the indicator mechanism is placed on the outside of this plate, and consists, mainly, of an indicator-ring bearing a series of numbers on its face and teeth on its inside edge, as shown in Figs. 2 and 3. In the drawings this ring bears the numbers 1 to 26, inclusive; but it may be larger or smaller and bear a greater or less number of numbers or other characters, as may be desired. This ring is placed in an annular recess formed in the face of the front plate of the lock or in the cap-plate C, or partly in both, the latter construction being preferred. Inside of this ring, and mounted on a suitable post or stud of the lock-case, is a small geared wheel meshing into the teeth on the inside edge of this ring. This indicator-wheel bears a series of letters. In the drawings it is marked with a portion of the alphabet, from A to P, inclusive; but, if desired, it may bear other characters.

The cap C covers the registering or indicator mechanism, except at one point, where suitable openings are made to show the contiguous characters on one division of the ring and wheel, respectively, as shown in Fig. 1. I prefer to place these openings side by side, as shown; but both divisions may show through a single opening, if desired, or the openings might be located at other point or points over the ring and wheel and produce the same result so far as part of the features of my invention are concerned. The cap C is also provided with the ordinary key-hole.

The ring and the wheel constitute two rotating indicators, the latter of which is placed inside of the former and at one side, so as to leave room to insert the key inside of the ring. Therefore the lettered wheel necessarily has a less number of divisions and teeth than the ring, so that the wheel makes a complete revolution while the ring is making only a part of a revolution, whereby when the parts are moved together the same letter on the wheel will not come opposite the same figure on the ring that it did in the last revolution.

As arranged in the drawings, with proper mechanism for moving the ring one division every time the lock is unlocked, the operation of locking and unlocking, if I have made no mistake in figuring, will have to be repeated four hundred and sixteen times before the same number and letter can be brought together a second time.

By making the divisions in the two rotating indicators of different relations to each other than those shown in the drawings a greater or less number of times will be required for producing the same result, and by making the divisions, together with the teeth, so that they have no common divisor, then the same letter and number can never be brought together a second time.

If desired, teeth might be formed on the outside edge of the ring and the geared wheel placed on the outside instead of the inside of the ring, although the latter is always to be preferred; or, if desired, a third indicator of defferent size and division may be placed on the outside of the ring, and meshing into it so as to register or indicate three different characters; also, two wheels of different size might be fixed on different centers inside of the ring for a like purpose.

I make the lettered wheel thinner than the ring, so as to make room for the operating mechanism, which is located behind the wheel and engages the edge of the ring.

The operating mechanism consists of a lever, B, having a spring-pawl, *b*, on its upper end. This lever is hung on any proper fixed fulcrum, as at *c*, Fig. 3, and its lower end has two arms, *d e*, which extend downward on opposite sides of the key-post *g*.

When the key is inserted and turned a portion of its bit strikes the arm *d* of the lever B and oscillates said lever to draw back the pawl *b* over two teeth of the ring. As the key-bit passes on it soon strikes the opposite arm, *e*, of said lever and throws the pawl in the opposite direction, thereby moving the ring and the wheel one division, and a different letter and number are registered or indicated through the openings in the cap-plate C.

To prevent unlocking the bolt by a partial turn of a key and then turning the key back without actuating the indicator mechanism, I notch the edge of the tumbler T for the sliding bolt to form a shoulder or detent, as shown at *t* in Fig. 4, so that when the key has been moved a certain distance to unlock the lock it cannot be moved backward so as to return the indicators to their former position, but must necessarily be turned forward to give a complete movement to the indicator before it can be removed. This it will be seen involves certain detection of the surreptitious use of a key, for either the key must be left in the lock or a change made in the indicators, either of which is sufficient. This detent *t*, it will be seen, is so relatively arranged that it catches the key before the latter acts to change the indicators and before it throws the bolt.

The stud *a* on the lock-bolt enters between the teeth of the ring to prevent moving the same, as shown in Fig. 2, except when the lock is being locked and unlocked. So soon as the lock-bolt is moved to disengage it from the shackle the stud *a* is disengaged from the teeth of the ring, so that it may then be moved.

For operating the lever B, I may cause the key to act on the same directly, or cause it to act on said lever indirectly through the locking-bolt. Thus, for the latter arrangement, I prefer to make the stud *a* wide enough so that when the lever B is moved in the direction to draw the pawl over the teeth of the ring the inside edge of said stud will engage the outside edge of the arm *d*, and thereby carry the lever in the direction to drive the pawl forward and move the indicators independently of the fact whether or not the key-bit properly engages the inner edge of the arm *e*. This, it will be seen, makes the movement of the indicators a necessary concomitant of the retraction of the bolt and prevents the opening of the lock by a skeleton-key which might not touch the pawl-lever. To further secure the bolt against being retracted by a skeleton-key without moving the pawl-lever, I form on the lower end of the forked pawl-lever a lug, $l^2$, (see Figs. 5 and 6,) which lug projects from the plane of the indicator mechanism back into the plane of the bolts and tumblers, so that if a skeleton-key be inserted to manipulate the bolt and tumblers it would first strike the lug $l^2$ of the pawl-lever and throw it back into a position ready to be moved by the withdrawal of the bolt.

If desired, another stud might be placed on the lock-bolt to engage the outside edge of the arm *e*, or the lever might have only a single lower arm resting in a slot or between two studs in the lock-bolt, so that the pawl would be operated both ways by the bolt and wholly independently of any engagement with the key-bit.

This lock is principally designed for use in the mail service; but it may be used for any purpose where it is desired to detect any unauthorized opening of the lock.

When locked, as shown in Fig. 1, a record may be made of the characters exposed to view and this information communicated to the proper officers on the route or at its destination. In case the lock has been opened a different number and letter will be indicated, so that the opening will be at once detected.

If there were but one indicator, or two of the same division, the lock could soon be manipulated so as to indicate the same as before; but with two differential indicators the great number of times of unlocking necessary to bring the same characters to view render it highly improbable that one unlawfully opening the lock should be able to manipulate it so as to indicate the same as before.

The lock may also be used to locate any act of pilfering by placing it on a through-mail pouch, recording the characters indicated at the forwarding-office, but without informing others, and then having every officer on the route whose hands it passes through record in like manner the characters indicated, and afterward a comparison of the several records, in case the lock was opened on the route, will reveal the place where it was done.

I am aware that indicator-locks of various constructions are old.

I am also aware that it is not new to construct a lock in such a manner as to prevent the turning back of the key after it is inserted and partially turned. I do not know, however, that this result has ever before been attained by forming a detent on the tumbler, which detent is an integral part of the tumbler. This constitutes one feature of my invention, and is a simple, compact, and desirable means for accomplishing that end.

What I claim as new is—

1. In combination with a lock, the indicator-ring and indicator-wheel, geared together and bearing suitable characters, and mechanism for partially rotating said ring and wheel every time the lock is unlocked, substantially as described, and for the purpose specified.

2. In an indicator-lock having a set of geared indicator-wheels with characters arranged to show through openings in a face-plate, the combination, with the lock proper, of two rotating indicators arranged in the same plane and having peripheral teeth which continuously mesh into each other, substantially as and for the purpose described.

3. In an indicator-lock, the combination of the indicator-ring and its operating mechanism with the lock-bolt bearing the stud *a* for engagement with the teeth on the inner edge of said ring, substantially as described, and for the purpose specified.

4. In an indicator-lock, the combination of the indicator-ring bearing teeth on its inside edge, the operating-lever located inside of said ring and bearing a spring-pawl for engaging the teeth of said ring, and suitable mechanism for operating said lever, substantially as described, and for the purpose specified.

5. In an indicator-lock having a set of geared wheels with characters arranged to show through openings in a face-plate, the combination of the lock proper with two rotating indicators arranged in the same plane and having peripheral teeth which continuously mesh into each other, mechanism for partially rotating said indicators every time the lock is unlocked, and mechanism for locking the indicators when the parts are at rest, substantially as and for the purpose described.

6. In an indicator-lock, the indicator-ring surrounding its operating mechanism and the key-hole of the lock, substantially as described.

7. The combination, with the indicator-wheels and their actuating-lever, of a locking-bolt having a projection or stud to act upon the lever and necessitate the movement of the indicator-wheels with the retraction of the bolt without direct action of the key upon said lever.

8. The combination, with the bolt-and-tumbler mechanism of an indicator-lock and the indicator mechanism located in a plane in front thereof, of a pawl-lever for operating the indicator mechanism, having a lug, $l^2$, extending back into the plane of the bolts and tumblers to cause the pawl to be drawn back by a skeleton-key ready to be advanced to move the indicators by the withdrawal of the bolt, as shown and described.

9. In an indicator-lock, the combination, with the indicator mechanism and a locking-bolt, of a tumbler provided with a detent, *t*, adapted to prevent back movement of the key prior to the engagement and operation of the indicator mechanism and the retraction of the bolt, substantially as described.

10. The combination, with a lock, of a tumbler having a detent to prevent back movement of the key, which detent is in the nature of a rigid projection or integral part of said tumbler, substantially as described.

Witnesses: FRANK W. MIX.

JASON C. FENN,

LESTER S. HUBBARD.